Dec. 15, 1936.                    G. FRENKEL                    2,064,060
                          MIRROR AND DISPLAY DEVICE
                             Filed Aug. 8, 1932

INVENTOR.
Gennady Frenkel.
By
Stone, Boyden, Mack & Hahn
ATTORNEYS.

Patented Dec. 15, 1936

2,064,060

UNITED STATES PATENT OFFICE 2,064,060

MIRROR AND DISPLAY DEVICE

Gennady Frenkel, Kingston-on-Thames, England

Application August 8, 1932, Serial No. 627,936
In Great Britain August 8, 1931

6 Claims. (Cl. 41—22)

This invention relates to advertising or display devices such as posters, advertising signs, facias, showcards, labels, banners, tickets, wrappers and decorative work generally, and has for its object to improve such devices by rendering the display matter luminous by reflected light and thus make the devices more attractive and effective. Another object is to provide daylight reflecting signs of improved construction, which are cheap to manufacture, light in weight, unbreakable, and also pliable if desired, wherein the use of heavy, breakable glass plates or sheets for obtaining the daylight effect is dispensed with.

Display devices fulfilling these objects are manufactured, in accordance with this invention by coating a backing of paper, cardboard, leather, fabric wood, metal or other pliable or rigid material with firmly adherent cellulosic or similar material to form a smooth mirror-carrying film and said film has deposited directly on it without any preliminary treatment thereof, a reflecting layer of metal by a suitable method in which the metal does not exist as a layer or film before deposition. The display matter may then be applied to the metal film as a thin film of opaque material by printing or in any other suitable manner. Instead of printing or otherwise applying the display matter directly onto the metal film, the latter may be coated with a protective film of transparent lacquer and the display matter printed on the latter.

Instead of forming the illuminating display matter by covering parts of the metal film with opaque material, it may be found preferable sometimes to form the reflecting metal film in the first instance only at those parts which are to show up as the illuminated display matter in the finished article. This is effected by printing or otherwise applying the display matter directly on to the backing and subsequently forming the mirror-carrying cellulosic film only on selected parts of the backing in accordance with the printing thereon, the reflecting metal film being then formed only on those parts of the backing which are coated with the carrier film.

The methods of deposition which I have so far found to be of practical use for the purpose in question are, for silver, the well-known method of deposition from the aqueous nitrate by reduction, and for gold, deposition from the vapour or by a sputtering process.

Instead of coating the backing with material to form the mirror-carrying film, the latter may be preformed and separate from the backing, to which it is firmly affixed at any suitable stage in the manufacture of the device.

In order that the invention may be understood more clearly, some features thereof are diagrammatically illustrated in the drawings in which.

Figure 1:
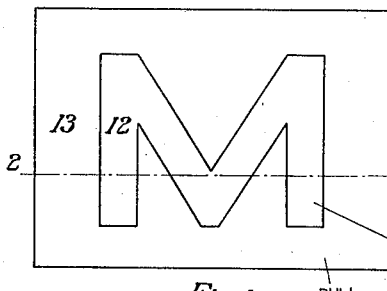
Fig. 1 represents, in elevation, a display device in the form of a letter.
Figure 2:
Fig. 2 is a section on line 2—2 of Fig. 1 illustrating the mode of construction.

Referring to Figs. 1 and 2, the device therein represented consists of a backing 10, e. g., of paper, coated on one side with cellulosic material to form a carrier film 11 on which is deposited a highly-reflecting metal film 12, which, in turn, is covered with a film 13 of opaque material in all parts except those which have to stand out to constitute the illuminated display matter, namely, the letter M. Any known process of carrying out the last-mentioned operation may be employed depending upon the kind of work required. For instance, the display matter may be printed on, with a background in black or some other colour, such that the matter stands out from the background as a highly reflecting surface; or background colour may be applied by hand or by what is known as a silk screen process.

Figure 3:
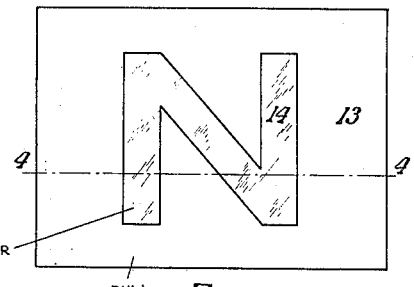
Fig. 3 represents, in elevation, another device of slightly different constitution from that of the device in Figs. 1 and 2.
Figure 4:
Fig. 4 represents a section on the line 4—4 of Fig. 3.
Figure 5:
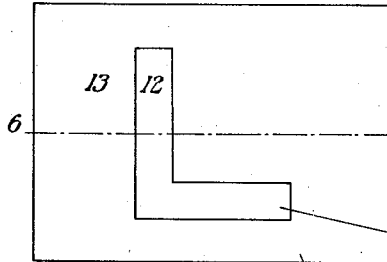
Fig. 5 represents a display device of modified construction.

The device represented in Figs. 3 and 4 is constituted similarly to that of Figs. 1 and 2, the difference being that the metal film 12 is coated with transparent cellulosic material to form a film 14 which protects the metal film during the subsequent operation of printing on the display matter N, which is thus, of course, printed on the protective film 14 and not directly on the metal film 12.

In manufacturing the device, the backing 10 has poured or sprayed on it, or is dipped in, solutions of cellulose derivatives in organic solvents, with or without the usual plastifiers. After drying, a smooth and strongly adherent film 11 is formed on the backing as if it had been highly polished. In some cases, depending upon the nature of the backing and also upon the circumstances in which the device is going to be used, it may be necessary to build up the film 11 from a series of coats of the same or different composition, as has already been explained. The backing 10 being thus prepared, silver, gold or other metal suitable for forming the desired highly reflecting surface is then deposited on the cellulosic film 11 by any suitable method, in which the metal does not exist as a layer or film before deposition, and in which, also, the deposited metal does not require polishing or burnishing before giving the desired reflecting surface. In the case of silver, for instance, a suitable method is to deposit the metal from the aqueous nitrate by reduction, which gives an extremely thin, highly-reflecting, metal film 13. For some metals, it may be advantageous to effect the deposition from a vapour of the metal.

If the backing used is flexible, such as paper or canvas, I may employ, for coating it, a method in which the backing in the form of a band or web is used as a carrier for the cellulosic film which is formed directly on it by pouring or spraying the cellulosic solution, so that the flexible carrier (backing) then becomes part of the product of the operation of manufacturing the cellulosic film. Furthermore, if a composite cellulosic film is required, for reasons explained in the foregoing, the backing may first be coated, in one machine, with an exceedingly thin cellulose film which by reason of its extreme thinness, will thus dry in the shortest space of time; and the dry, coated backing is then transferred to another machine (leaving the first free for treatment of more backing), where it is used as a carrier for the formation of a second film. This procedure of drying the film and transferring it to another machine for the production of a new film thereon may be repeated the desired number of times and with different composition of the cellulosic solutions until the desired composite film has been built up.

Figs. 5 to 8 illustrate display devices of modified construction in that the display matter is applied to the backing before deposition of the reflecting metal film.

Figure 7:
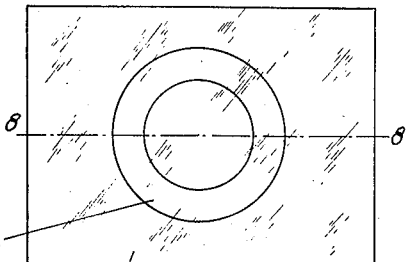
Fig. 7 represents another device differing slightly from that of Figs. 5 and 6.
Figure 6:
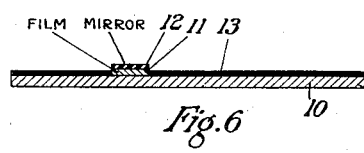
Fig. 6 is a section in line 6—6 of Fig. 5 illustrating the mode of construction in this case.
Figure 8:
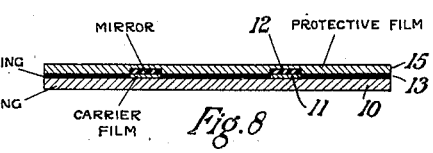
Fig. 8 represents a section on line 8—8 of Fig. 7.

Referring to these figures, the display matter 13 is printed on, or otherwise applied to, the backing 10 in stencil fashion; that is to say, the backing 10 is covered with the printing ink or other opaque material 13 in all parts which are not required to stand out in the finished article. The cellulosic carrier film 11 is then formed only on those parts of the backing which are not covered by the ink 13, and the reflecting metal film 12 is deposited only on those selected parts of the backing which are provided with the film 11. The device represented in Figs. 7 and 8 is further provided with a transparent cellulosic film 15 which constitutes the outer surface of the device. This film 15 protects the device, particularly the reflecting portion 12 thereof, from damage and the effects of the weather and also furnishes the device with a lustrous finish which thereby enhances its appearance and attractiveness.

The devices represented in Figs. 1 to 4 may also be provided with a similar transparent outer film 15 (not shown). If the metal used for depositing the film 12 is silver, a protective film such as 15 becomes a necessity in order to prevent tarnishing, but if an untarnishable, weather-resisting metal such as chromium or cadmium is employed, such a film 15 is optional.

By means of my invention, light, pliable, luminous display devices can be made which can be used as stationary or moving signs.

For mounting purposes, the appropriate surface of the finished device must be such that it can be readily made to adhere to the mount, and therefore a suitable adhesive may already be provided on the backing of the device, or it may be applied at the time of mounting. If, however, the device is to be affixed to a transparent mount, such as a shop window, so as to be viewed therethrough, the transparent outer film may be of such a nature as will enable ordinary transparent adhesive glues and pastes to be used. Such film may contain material which becomes tacky and ready for fixing on wetting with a solvent; in the case of a cellulosic film, for example, the device may be mounted by moistening the outer film with a dilute organic solvent of strength insufficient to attack more than the surface of the film.

In the foregoing, cellulosic material has been mentioned specifically as constituting the mirror-carrying film, but this is intended by way of example only, as other substances such as natural and synthetic resins and derivatives, rubber, pitches and asphalts, may equally well be employed, so long as they give the necessary smooth, firmly adherent mirror-carrying surface. In this connection, I have observed that substances suitable for this purpose are generally dielectrics. However, I do not wish to include within the scope of my invention, gelatine and similar highly hygroscopic substances.

By my invention I contemplate primarily the manufacture of display devices, particularly advertising signs and facias, from paper, canvas, and the like light, pliable materials, in substitution for similar devices which have hitherto been made, employing glass sheets and plates. I therefore definitely exclude the use of glass from the scope of my invention. However, I also conceive within the scope of my invention, the conversion of sheets of wood, metal or similar rigid, unbreakable, material into attractive display devices in the manner which I have described in the foregoing specification.

I claim:

1. Display device, comprising a backing of non-reflecting opaque material, a film of cellulosic material applied to said backing, a reflecting film of metal deposited on said cellulosic film, and display matter applied to said metal film as a thin film of opaque material.

2. Display device, comprising a backing of non-reflecting opaque material, a film of cellulosic material applied to said backing, a reflecting film of metal deposited on said cellulosic film, a film of transparent cellulosic material applied to said metal film, and display matter applied, as a thin film of opaque material, to said cellulosic film last-mentioned and over a portion of the area thereof but incompletely covering the area of said metal reflecting surface.

3. The manufacture of a display device by coating a backing of non-reflecting opaque material with cellulosic material to form a firmly adherent smooth film, depositing directly on said film a fine film of metal so as to directly form a highly reflecting surface, coating said metal film with a film of transparent cellulosic material, and applying a film of opaque material to said cellulosic film last-mentioned to form display matter and over a portion of the area thereof but incompletely covering the area of said metal reflecting surface.

4. The manufacture of a display device by coating a backing of non-reflecting opaque flexible material with a solution of cellulosic material to form, on drying, a firmly adherent smooth film thereon, depositing a thin film of silver to constitute a reflecting surface directly on said cellulosic film by reduction thereon of silver nitrate, coating said silver deposit with a solution of cellulosic material to form, on drying, a transparent protective film thereon, and printing display matter on said protective film as a substantially opaque coating over a portion but not all of the area of said reflecting surface.

5. In a display device comprising a backing of non-reflecting opaque material, an area of said backing covered with a cellulosic film, a reflecting film of metal deposited on said cellulosic film, and an area of opaque material over a portion but not all of the area covered by said metal coated cellulosic film so as to display some portion of the metal reflecting material.

6. In a display device comprising a backing of non-reflecting opaque material, an area of said backing covered with a cellulosic film, and a reflecting film of metal deposited on said cellulosic film, and a structure concealing some but not all of the area of said film of metal, whereby the contrasting opaque surface and reflecting film constitute display matter.

GENNADY FRENKEL.